Patented July 10, 1928.

1,676,642

UNITED STATES PATENT OFFICE.

OTTO L. FLUEGEL, OF BIRMINGHAM, MICHIGAN.

PROCESS FOR COMPOUNDING INGREDIENTS OF A CHEMICAL PAINT REMOVER.

No Drawing.   Application filed January 24, 1925.  Serial No. 4,445.

My invention relates to a process of combining ingredients in a paint removing composition, without the application of other agencies, and in such a manner that the reaction of the ingredients of applicant's composition by the process to be herein described will combine with, or neutralize certain elements or properties therein, of the other ingredients previously added, and using the heat of reaction of certain ingredients for changing the properties of the composition without the application of further heat.

Most compositions forming a paint remover now in common use, requires a binding material such as wax, for producing an adhesive property in order to make the solution applicable to vertical surfaces in removing the paint therefrom. Also, many poisonous and dangerous gases emanate therefrom, when the solution is exposed to the air in applying same to painted surfaces, thus making it extremely dangerous to use same, because of possible injury to the person, or from an explosion from the effervescing gases, if ignited by a flame. Many of the compositions now in use will, when applied to painted surfaces, merely soften the paint composition which can then easily be removed, but which will again harden if allowed to stand and dry.

Instead of depending solely upon a special wax, for binding and holding the several ingredients in the paint removing composition together, and for producing an adhesive property to the composition, as required when applied to vertical walls, starch is used, which will combine with other ingredients or gelatinize under the process herein set forth, by reason of the reaction of the other ingredients therein, if added thereto at a certain stage of the process. A certain reaction taking place therein, chemically combining certain ingredients, and tends to neutralize and change the properties of other ingredients therein, compounding the solution and combining the ingredients therein so that no precipitate will form or effervescence of gases take place.

The ingredients used in the paint removing composition are, caustic alkali, tri-sodium phosphate, oxalic acid, hydrate of lime, starch, and water. The preferred proportions used for compounding one gallon of the composition are as follows: 1 pound of caustic alkali, one half pound of tri-sodium phosphate, one half pound of oxalic acid, one pound of hydrate of lime, three ounces of starch, and water. The tri-sodium phosphate and the oxalic acid, being in a powdered form, are mixed together and dissolved in about one quart of water, forming a thin cream thereof. The hydrate of lime is also made into a thin cream by adding about one quart of water thereto, and then both creams are mixed together. The starch, which is used for a binder and for producing an adhesive property in the composition, is dissolved in about one pint of cold water, forming a thick cream thereof, and is mixed in the composition of tri-sodium phosphate, oxalic acid and hydrate of lime, during a rapid agitation of the composition, preventing any of the chemicals therein from forming starch globules. A solution of caustic alkali is made by pouring about three pints of cold water on the pulverized or flake caustic alkali, and which generates heat immediately upon contact with water, causing boiling therein, and the same dropped at once into the combined composition heretofore set forth, during which time it must be subjected to a rapid agitation, and so continued until bubbling ceases, and then slowly agitated until the composition is cooled. The intense heat of the caustic alkali, combining the ingredients therein, attacking and changing the property of the starch, and all of the acid properties being neutralized, by chemical reactions, forming a composition which will not precipitate, or effervesce any gases when exposed to the air, and which will adhere to any painted vertical surface without the separation of any of the ingredients of which it comprises. By use of this process, no heat from other sources is needed for completing the chemical combination.

The caustic alkali referred to throughout the specifications, includes both caustic potash and caustic soda.

Having fully described my process for compounding a paint removing solution, what I claim as my invention and desire to secure by Letters Patent, is:

1. A process for preparing a paint remover compound, by mixing tri-sodium phosphate and oxalic acid in water, making a thin cream thereof, also mixing hydrate of lime in water, making a thin cream thereof, then mixing the two compositions together, and adding thereto a thick starch cream made by adding cold water to the starch, at the same time rapidly agitating the combining compositions to prevent formation of starch globules therein, then prepare a mixture of caustic alkali and water and drop same quickly into the above resulting compound while the caustic mixture is boiling, stirring the whole mixture rapidly until the composition ceases boiling.

2. A process for preparing a paint remover compound, by mixing tri-sodium phosphate and oxalic acid in water making a thin cream thereof, also mixing hydrate of lime in water making a thin cream thereof, then mixing the two compositions together, and adding thereto a thick starch cream made by adding cold water to the starch, at the same time rapidly agitating the combining compositions to prevent formation of starch globules therein, followed by pouring a boiling solution of caustic alkali therein, stirring the whole mixture rapidly until the composition ceases boiling.

OTTO L. FLUEGEL.